US007881242B2

(12) United States Patent
Chen et al.

(10) Patent No.: US 7,881,242 B2
(45) Date of Patent: Feb. 1, 2011

(54) SYSTEM AND METHOD FOR FRAME RE-TRANSMISSION IN A BROADCAST COMMUNICATION SYSTEM

(75) Inventors: Tao Chen, San Diego, CA (US); Nikolai K. N. Leung, Takoma Park, MD (US); Edward G. Tiedemann, Concord, MA (US); Ragulan Sinnarajah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 647 days.

(21) Appl. No.: 11/227,887

(22) Filed: Sep. 14, 2005

(65) Prior Publication Data

US 2006/0023715 A1 Feb. 2, 2006

(51) Int. Cl.
*H04H 20/71* (2008.01)
*H04L 12/26* (2006.01)
*H04J 1/16* (2006.01)
*G08C 15/00* (2006.01)
*G06F 11/00* (2006.01)

(52) U.S. Cl. .................. 370/312; 370/252; 370/338; 370/389; 714/748

(58) Field of Classification Search ......... 370/216–252, 370/328–390, 410–432, 312–336, 349–521; 709/219–230; 714/4–18, 748–752; 455/442–522
See application file for complete search history.

(56) References Cited

U.S. PATENT DOCUMENTS

| 1,350,484 A | | 8/1920 | Bailey |
| 1,932,576 A | | 10/1933 | Dodge |
| 1,982,510 A | | 11/1934 | Frazey |
| 5,553,083 A | * | 9/1996 | Miller .................. 714/748 |
| 5,991,410 A | * | 11/1999 | Albert et al. ............. 705/78 |
| 6,031,818 A | * | 2/2000 | Lo et al. ................. 370/216 |
| 6,076,181 A | * | 6/2000 | Cheng .................... 714/748 |
| 6,404,739 B1 | * | 6/2002 | Gonno ................... 370/236 |
| 6,581,176 B1 | * | 6/2003 | Seo ....................... 714/749 |
| 6,778,497 B1 | * | 8/2004 | Choi ...................... 370/231 |
| 6,956,855 B1 | * | 10/2005 | Chang .................... 370/394 |
| 7,007,199 B2 | * | 2/2006 | Jinzaki et al. ............ 714/18 |

(Continued)

FOREIGN PATENT DOCUMENTS

EP 0876023 11/1998

(Continued)

OTHER PUBLICATIONS

Wang, Jonathan L., et al.; "Throughput Optimization of the Adaptive Multi-Receiver Selective-Repeat ARQ Protocols Over Broadcast Links," Computer Communication Technologies for the 90's, Oct. 30-Nov. 3, 1988, pp. 244-250, XP000077384.

(Continued)

*Primary Examiner*—Man Phan
(74) *Attorney, Agent, or Firm*—Rupit M. Patel

(57) ABSTRACT

An apparatus for providing frame re-transmission in a broadcast communication system. Frame re-transmission is accomplished only when a predetermined number of negative acknowledgement messages are received with respect to one or more data frames. The predetermined number may vary in accordance with various operating parameters, such as the latency of the transmission and/or the number of wireless communication devices currently receiving a broadcast transmission.

21 Claims, 4 Drawing Sheets

U.S. PATENT DOCUMENTS

| | | | |
|---|---|---|---|
| 7,093,000 B1 * | 8/2006 | Yamagishi et al. | 709/219 |
| 7,103,817 B1 * | 9/2006 | Choksi | 714/748 |
| 7,185,256 B2 * | 2/2007 | Miki et al. | 714/751 |
| 7,188,293 B2 * | 3/2007 | Park | 714/748 |
| 2003/0043771 A1 * | 3/2003 | Mizutani et al. | 370/338 |
| 2004/0078624 A1 * | 4/2004 | Maxemchuk et al. | 714/4 |

FOREIGN PATENT DOCUMENTS

| | | |
|---|---|---|
| JP | 62-299139 | 12/1987 |
| JP | 63-042246 | 2/1988 |
| JP | 09-270790 | 10/1997 |
| JP | 10-257001 | 9/1998 |
| JP | 11-017737 | 1/1999 |
| JP | 2001-160814 | 6/2001 |

OTHER PUBLICATIONS

Yu, Tae-Ho, et al., "Reliable Multicast Protocol by Sequence (RMPS)," VTC 2001, Spring, IEEE Vehicular Technology Conference, New York, NY, vol. 3 of 4, Conf. 53, May 6, 2001, pp. 2157-2161, XP001082525.

International Search Report—PCT/US02/021155, International Search Authority—European Patent Office, Nov. 25, 2002.

* cited by examiner

SYSTEM AND METHOD FOR FRAME RE-TRANSMISSION IN A BROADCAST COMMUNICATION SYSTEM

BACKGROUND OF THE INVENTION

I. Field of the Invention

The present invention relates to broadcast communications, otherwise known as point-to-multipoint or group communications, in a wireline or a wireless communication system. More particularly, the present invention relates to a system and method for providing frame re-transmission in such a broadcast communication system.

II. Description of the Related Art

The field of wireless communications has many applications including cordless telephones, paging, wireless local loops, and satellite communication systems. A particularly important application is cellular telephone systems for mobile subscribers. (As used herein, the term "cellular" systems encompasses both cellular and PCS frequencies.) Various over-the-air interfaces have been developed for such cellular telephone systems including frequency division multiple access (FDMA), time division multiple access (TDMA), and code division multiple access (CDMA). In connection therewith, various domestic and international standards have been established including Advanced Mobile Phone Service (AMPS), Global System for Mobile (GSM), and Interim Standard 95 (IS-95). In particular, IS-95 and its derivatives, such as IS-95A, IS-95B (often referred to collectively as IS-95), ANSI J-STD-008, IS-99, IS-2000, IS-657, IS-707, and others, are promulgated by the Telecommunication Industry Association (TIA) and other well known standards bodies. Generally, information transmitted in such systems is formatted into discreet packets, otherwise known as data packets or data frames, or simply frames. To increase the likelihood that a frame will be successfully transmitted during transmission various re-transmission schemes have been developed. For example, a radio link protocol (RLP) has been developed to perform frame re-transmissions when one or more frames are not successfully received. The RLP protocol controls how and when frames are re-transmitted from a transmit system to a receiver.

In order to determine which frames have not been received successfully using RLP, an eight-bit sequence number is included as a frame header in each frame transmitted. The sequence number is incremented for each frame from 0 to 256 and then reset back to zero. An unsuccessfully received frame is detected when a frame with an out-of-order sequence number is received, or an error is detected using CRC checksum information or other error detection methods. Once an unsuccessfully received frame is detected, the receiver transmits a negative-acknowledgment message (NAK) to the transmit system that includes the sequence number of the frames that were not received correctly. The transmit system then re-transmits the frame including the sequence number as originally transmitted. If the re-transmitted frame is still not received successfully, a second re-transmission request is sent to the transmit system, this time requesting that the frame be transmitted twice. If the frame is still not received successfully, a third retransmission request is sent to the transmit system, this time requesting that the frame be transmitted three times. If the frame is still not received successfully after the third retransmission request, no further retransmissions are requested, and the frame is ignored at the receiver for use in reconstructing the original data.

The frame re-transmission scheme just described is an example of a scheme used for point-to-point communications between a transmit system and a receiver. Such a re-transmission system is impractical in a broadcast communication system because of the potential for an almost unlimited number of re-transmission requests from the various receivers. Specifically, for any given frame, the probability of a frame being received in error (or not at all) is much higher in a broadcast transmission system than in a point-to-point broadcast system. As the number of receivers increase, the probability of a retransmission being needed increases dramatically. Also, as the number of re-transmissions increase, the delay, or latency, of transmitting new information increases to a point at which an application using the information at a receiver is noticeably impacted. For example, delays of more than a few hundred milliseconds in speech can result in unacceptable voice quality at a receiver. Furthermore, this retransmission scheme also depends on the existence of a feedback channel. That is, there has to be two-way communication between the transmitter and the receiver for the scheme to function properly. In some systems, such a two-way link might not be available.

What is needed is a method and apparatus for frame re-transmission in a broadcast communication system which avoids the problems of latency.

SUMMARY OF THE INVENTION

The present invention is directed to a method and apparatus for providing high-speed broadcast communications. In one embodiment, the present invention is directed to an apparatus, the apparatus comprising a receiver for receiving a message indicative of a frame received in error by a wireless communication device, the message including an identification of the frame. A memory is used for storing a predetermined number for determining when to re-transmit each frame. A processor is used for determining a cumulative number of times that the frame was received in error and for ordering a re-transmission of the frame if the cumulative number of times is greater than the predetermined number.

In another embodiment, the present invention is directed to a method, the method comprising the steps of receiving a message indicative of a data frame received in error by a wireless communication device, the message including a data frame identification; determining a cumulative number of times that said data frame has been received in error; and re-transmitting said data frame if said cumulative number is greater than a predetermined number.

BRIEF DESCRIPTION OF THE DRAWINGS

The features, objects, and advantages of the present invention will become more apparent from the detailed description set forth below when taken in conjunction with the drawings in which like reference characters identify like features correspondingly throughout.

DETAILED DESCRIPTION

The present invention is directed to a method and apparatus for providing frame re-transmission in a broadcast communication system. Although the embodiments are described with respect to a terrestrial-based wireless communication system, it should be understood that the present invention could also be used in other wireline and wireless communication systems, such as in a satellite communication system, as well. It should also be understood that the embodiments described herein could also be used in a number of alternative wireless communication systems, such as in a code division multiple access (CDMA) system, a Global System for Mobile communication (GSM) system, or in other well known wireless communication systems.

Figure 1:
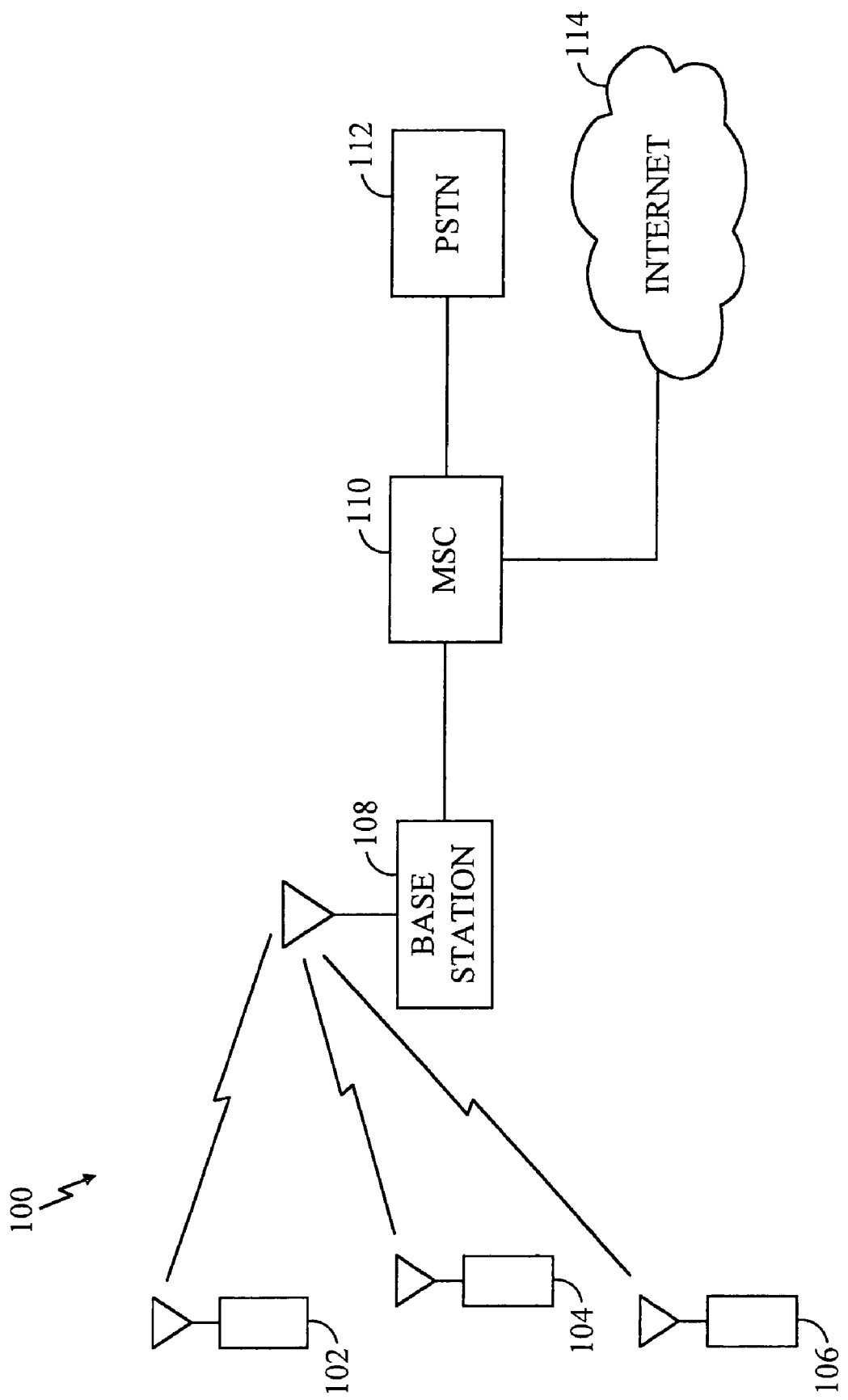
FIG. 1 is an illustration of a wireless communication system in which wireless communication devices are in communication with a base station.

FIG. 1 is an illustration of a wireless communication system 100 in which wireless communication devices (WCDs) 102, 104, and 106 are in communication with base station 108. Base station 108, in turn, communicates with mobile switching center (MSC) 110. MSC 110 interfaces to public switched telephone network 112 and Internet 114 to provide two-way voice and data communications to WCDs 102, 104, and 106.

Each WCD is capable of receiving broadcast messages intended for multiple recipients over a forward broadcast control channel (F-BCCH), i.e., a logical communication channel from base station 108 to a WCD. The messages broadcast over the F-BCCH are generally low-speed data messages typically comprising text messages. There are a number of methods well known in the art for any WCD to receive a broadcast message over the F-BCCH. The methods generally involve the WCD monitoring a predefined frequency, time slot, and/or code (i.e. Walsh code for CDMA systems) to receive a page message indicating the availability of a broadcast message directed to the WCD. Instructions for receiving the broadcast message may be transmitted to a WCD via the forward common control channel (F-CCCH), which is a communication channel that is received by each WCD in communication system 100.

Communication system 100 may offer some form of point-to-point high-speed communications. In a cdma2000A communication system, for example, a Forward Supplemental Channel (F-SCH) is defined which allows data rates up to 307 kbs from base station 108 to an individual WCD. Low-speed data is available through a F-SCH, a Forward Fundamental Channel (F-FCH) or a Forward Dedicated Control Channel (F-DCCH) which is assigned to a particular WCD.

Communication system 100 introduces a forward high-speed broadcast channel, or F-HSBCH for use in transmitting high-speed data (in one embodiment, 64 kbs or greater), such as Internet Protocol (IP) datagrams. The F-HSBCH allows users to receive streaming audio and video information. In addition, the F-HSBCH could be used to transfer large computer files over the air. Finally, such a system could allow push-to-talk communications, for either data or voice applications.

In one embodiment, high-speed data is transmitted from one or more base stations to multiple WCDs using the F-HSBCH. Each WCD may also monitor one or more paging or control channels to receive signaling and instructions from a base station in order to, for example, receive point to point voice calls, receive high-speed data on a different frequency/time slot/code, to receive SMS or other low speed group messages, etc. For example, a WCD may monitor a forward paging channel (F-PCH). In one embodiment, each WCD monitors the F-BCCH and F-CCCH channels for such information. In another embodiment, this information is received by monitoring a F-DCCH which is a signaling channel used to transmit information to WCDs on an individual basis.

The F-HSBCH may use a re-transmission scheme to ensure reception of information to WCDs. In point-to-point wireless communication systems, re-transmission is accomplished by providing feedback from a WCD to a base station. For example, the well-known Radio Link Protocol (RLP) used in CDMA communication systems use negative acknowledgement messages (NAKs) to indicate the non-receipt of one or more information frames. However, such a scheme cannot be used in a broadcast communication system because of the potential for endless re-transmission requests from the various WCDs receiving information. That is, as the number of WCDs increase, the probability of any frame requiring transmission increases dramatically. The present invention is directed to a re-transmission scheme for use in broadcast communication systems.

In one embodiment, data frame re-transmission occurs only when a predetermined number or percentage of WCDs request re-transmission using NAKs, ACKs (acknowledgement messages), or any other method of signaling known in the art. The predetermined number of re-transmission requests may comprise a fixed number or it may be dynamic, based on one or more operating conditions of the communication system. For example, in one embodiment, as the delay of transmitting new frames from the base station increases due to an increasing number of frame re-transmissions, the predetermined number of re-transmission requests needed to trigger frame re-transmission decreases, and vice-versa. The delay of transmitting new frames may be measured by determining the number of new frames waiting to be transmitted in an electronic memory, or buffer.

In another embodiment, frame retransmission occurs based on the number of WCDs receiving a specified broadcast. For example, if only 2 WCDs are receiving a streaming audio feed and a single NAK is received from one of the WCDs, the base station will re-transmit the necessary frame(s). However, if 100 WCDs are receiving a data file, the predetermined number of re-transmission requests needed to trigger frame re-transmission would be higher, for example, 10 NAKs would need to be received before re-transmission occurs. The number of WCDs receiving a particular broadcast may be determined by accessing a home location register (HLR) or a visitor location register (VLR) associated with a particular base station or base station sector and counting the number of WCDs registered to receive such a broadcast. This information may be used alone or in conjunction with indications from WCDs over reverse signaling links requesting participation in the particular broadcast.

Typically, when a frame is received in error (or if a frame is not received at all) by a WCD, the WCD will transmit a NAK to the base station indicating which frame(s) are needed for re-transmission. The NAK may be transmitted over any number of reverse communication channels. For example, in a CDMA2000A compliant communication system, NAKs may be transmitted over a reverse access channel (R-ACH), an extended reverse access channel (R-EACH), a reverse dedicated control channel (R-DCCH), or a reverse common control channel (R-CCCH).

Figure 2:
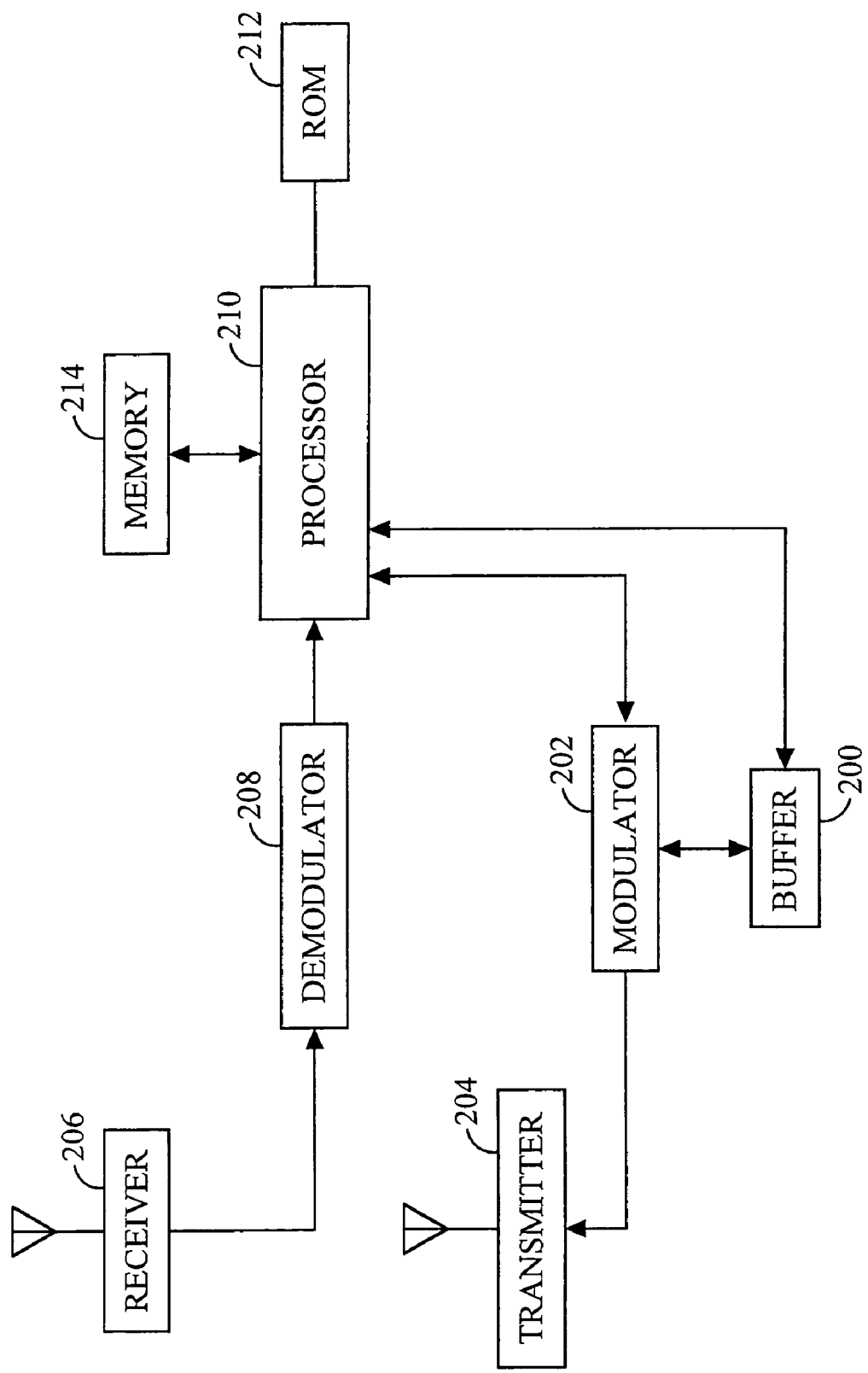
FIG. 2 illustrates a portion of the base station of FIG. 1 comprising logical elements needed for data transmission and re-transmission request processing.

FIG. 2 illustrates a portion of base station 108 comprising logical elements needed for data transmission and re-transmission request processing. Normally, pre-formatted data is supplied to buffer 200 for temporary storage prior to modulation by processor 210. Buffer 200 comprises a re-writeable electronic memory, such as a random access memory (RAM). The stored data in buffer 200 is then supplied to modulator 202, where it is then modulated in accordance with the chosen communication system type. Modulator 202 may comprise discrete electronic components, a VLSI microchip, a custom ASIC, a processor executing a series of executable computer instructions, or a combination of the above, for modulating data from buffer 200. Modulator 202 modulates data in accordance with the chosen communication system type, for example, CDMA, TDMA, or GSM. Modulator 202 is well-known in the art.

Modulator 202 generally modulates data frames from buffer 200 at a constant rate and provides the modulated data frames to transmitter 204 where the modulated data frames are upconverted and wirelessly transmitted to one or more WCD's within a coverage area of base station 108.

If one or more data frames are not received correctly (or not received at all) by a WCD, the WCD may generate a request for base station 108 to re-transmit the "missing" frame(s). The request is generally known as a re-transmission request and, in one embodiment, known as a negative acknowledgement message or NAK. The NAK generally identifies which frames are missing so that base station 108 can re-transmit the necessary frames.

When a NAK is transmitted by a WCD, it is received at base station 108 by receiver 206. Receiver 206 downconverts the NAK and provides it to demodulator 208. Demodulator 208 demodulates the NAK in accordance with the type of communication system used, for example, in accordance with CDMA, TDMA, GSM, or others. The NAK is then provided to processor 210. Processor 210 comprises a microcomputer performing a set of executable computer instructions stored in a non-volatile electronic memory, such as read-only memory (ROM) 212. ROM 212 could alternatively comprise any number of known electronic memories, including an electrically-erasable programmable read-only memory (EEPROM), an erasable programmable read-only memory (EPROM), or a flash memory.

When a NAK is received by processor 210, processor 210 evaluates which frames are being requested for re-transmission. The frames may be identified by any technique known in the art, for example, by numbering data frames as they are transmitted. After processing the NAK, processor 210 stores pertinent details of the NAK in erasable memory 214. Erasable memory 214 typically comprises a random access memory (RAM) or other electronic memory device for non-permanent electronic data storage. Processor 210 may store information relating to the received NAK, such as an identification of requested data frames for re-transmission and/or the time of receipt of the NAK. An identification of the WCD which transmitted the NAK may also be stored. Such an identification typically accompanies each NAK, as is well-known in the art.

Processor 210 then determines whether to re-transmit one or more of the data frames requested in the NAK. Re-transmission will occur under certain conditions, described in detail below. If processor 210 determines that frame re-transmission is necessary, it instructs modulator 202 to select the desired data frames from buffer 200. Modulator 202 then modulates the identified frame(s) and provides the modulated frame(s) to transmitter 204 for transmission to one or more WCDs.

Figure 3:
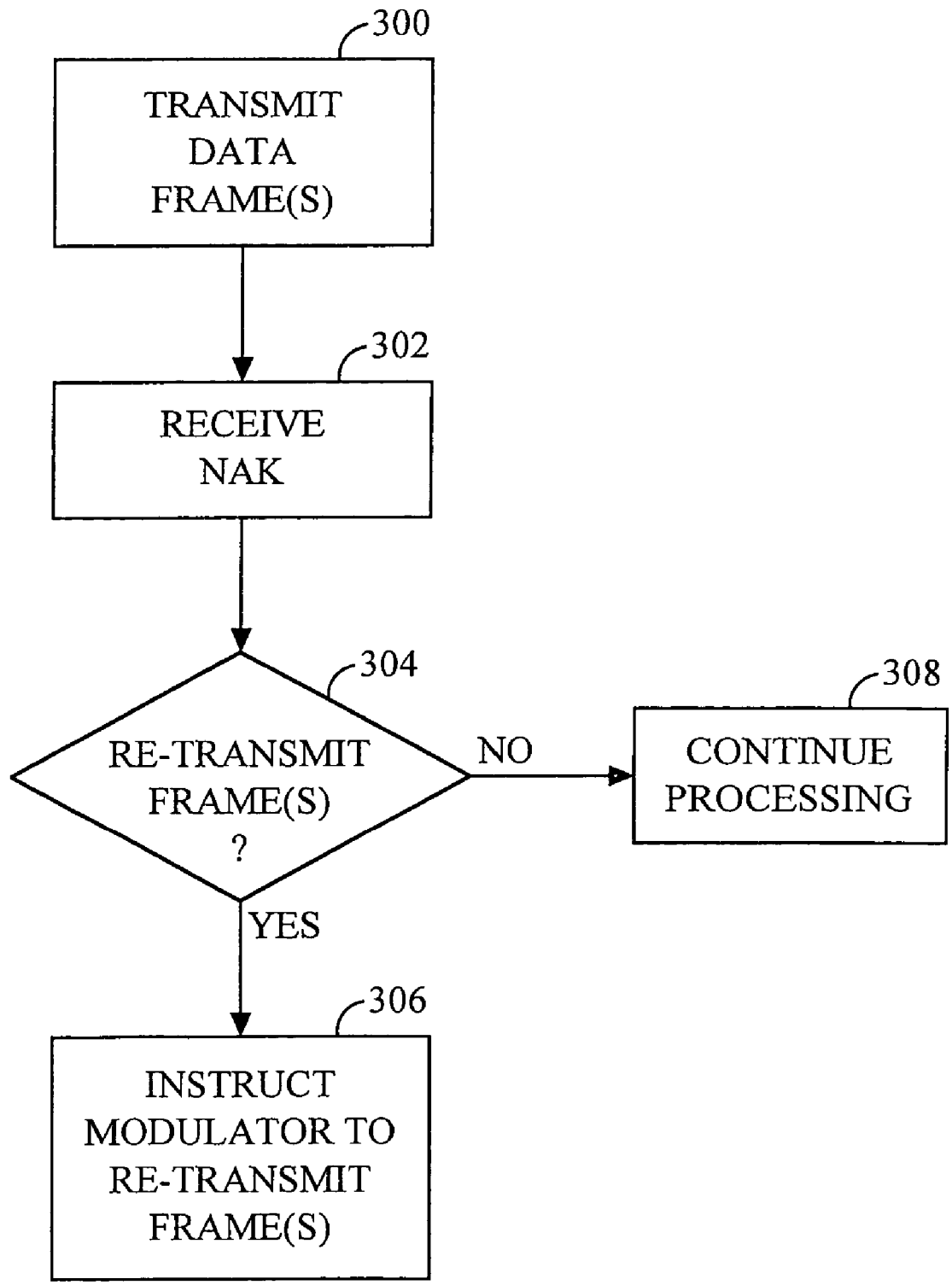
FIG. 3 is a flow diagram illustrating one embodiment of a method for providing frame re-transmissions in a broadcast communication system.

FIG. 3 is a flow diagram illustrating one embodiment of a method for providing frame re-transmissions in a broadcast communication system. In step 300, one or more data frames are transmitted from base station 108 to one or more WCDs. In step 302, a first NAK is received from a WCD which identifies one or more data frames which were not successfully received. In step 304, processor 210 determines whether or not to re-transmit the requested data frames based on previously received NAKs. In step 306, if processor 210 determines that a re-transmission is needed, processor 210 instructs modulator 202 to re-transmit an identified number of data frames. If processor 210 determines that a re-transmission is not needed, no action is taken by processor 210 with respect to frame re-transmissions, as shown in step 308.

Figure 4:
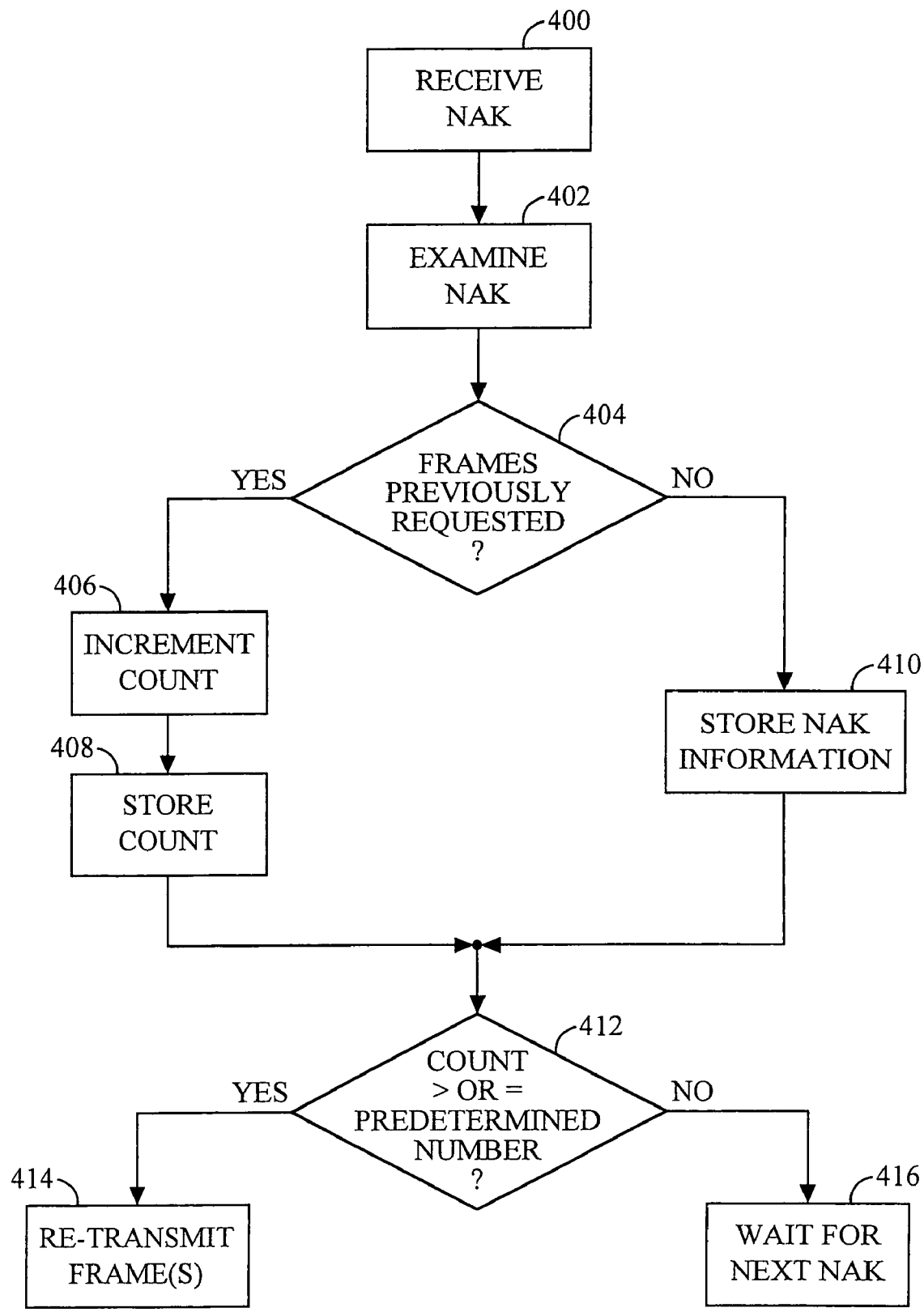
FIG. 4 is a flow diagram illustrating one embodiment for determining whether or not to re-transmit requested frame(s) when a negative acknowledgement message (NAK) is received.

FIG. 4 is a flow diagram illustrating one embodiment for determining whether or not to re-transmit requested frame(s) when a NAK is received. In step 400, a NAK is received from a WCD. In step 402, processor 210 examines the NAK to determine which frames are being requested for re-transmission and to determine a WCD identification. In step 404, processor 210 examines memory 214 to determine whether or not one or more of the requested data frames have already been requested by another WCD, evidenced by a WCD identification stored in memory 214. If another WCD has requested at least one of the frames requested by the just-received NAK, processor 210 increments a count indicative of the number of times one or more frames have been requested for re-transmission, as shown in step 406. The count is then stored in memory 214 in association with the requested data frames, as shown in step 408.

In another embodiment, processor 210 assigns a count to each data frame identified by a NAK and stores the identity of each frame and its associated count in memory 214. As NAKs are received, processor 210 compares each data frame identified by the NAK to the number of times each data frame has been requested for re-transmission as indicated in memory 214. If the number of re-transmission requests associated with a particular data frame is equal to the predetermined number, that data frame is re-transmitted. In another embodiment, a count is not incremented unless its associated frame is being requested by a new WCD, i.e., a WCD that has not previously requested the particular frame. In this embodiment, a WCD identification is stored as each NAK is received so that subsequent retransmission requests can be checked to ensure uniqueness.

If another WCD has not previously requested re-transmission of the frames identified by the just-received NAK, processor 210 stores information associated with the just-received NAK in memory 214, as shown in step 410. Such information includes at least an identification of the data frames requested for re-transmission. The information may further include a count associated with the number of times the identified data frames have been requested for re-transmission.

In step 412, processor 210 compares the count associated with the just-received NAK to a predetermined number to determine whether or not to re-transmit the desired data frames. If the count is greater than or equal to the predetermined number, processor 210 instructs modulator 202 to re-transmit the frames identified in the just-received NAK, as shown in step 414. If the count is less than the predetermined number, processor 210 does not order a re-transmission, and processor 210 waits to receive another NAK, as shown in step 416.

The predetermined number may be a fixed number or a variable number. If it is a fixed number, it is chosen to avoid excessive re-transmissions as this will interrupt the transmission of new information to WCDs. For example, the predetermined number may comprise the number 10, so that a re-transmission will not take place until at least 10 WCDs request re-transmission of the same frames.

If the predetermined number is a variable number, it may vary in accordance with one or a number of factors determined by processor 210 or by an external signal provided by another processor (not shown). In general, the predetermined number will vary depending on the delay, or latency, of data frames waiting to be transmitted. In one embodiment, the latency may be measured by examined buffer 200. As the number of data frames awaiting transmission in buffer 200 increases, the latency associated with those data frames increases. Processor 210, therefore, may measure the current latency by determining the number of data frames stored in buffer 200. If the number of data frames stored in buffer 210 exceeds one or more predetermined thresholds, the predetermined number needed for re-transmissions increases accordingly, and vice-versa.

In another embodiment, the predetermined number may vary based on the number of WCDs receiving a group transmission. In this embodiment, the predetermined number increases as more WCDs receive the transmission, and vice-versa. For example, if only two WCDs are receiving a broadcast transmission and one of the WCDs transmits a NAK, processor 210 may re-transmit the identified data frames based on receipt of a single re-transmission request. In this case, the predetermined number is equal to zero. If one hundred WCDs are receiving a broadcast transmission, then processor 210 may not order a re-transmission until many more NAKs are received identifying the same data frames, for instance 20 such NAKs.

Of course, other embodiments could use a combination of the fixed or variable techniques just discussed. For example, basing the predetermined number on the number of WCDs receiving a broadcast transmission and the transmission latency. In this example, re-transmissions may be based on a variable predetermined number, but limited by a pre-defined upper limit on the amount of latency that may be tolerated by the receiving WCDs. Other combinations are, of course, possible.

In yet another embodiment, the predetermined number is based on the type of media being broadcast to WCDs. In this embodiment, if the media is non-time sensitive, the predetermined number is set to a relatively low number, perhaps even one. Non-time sensitive media may include data files such as email and software programs and is generally identified by a small or non-existent impact from a WCD user's perspective. Time sensitive media may include voice or video information and is generally categorized by relatively small latency delays causing a noticeable negative impact on a WCD user's application. For example, small latency delays generally have a noticeable negative impact on a user's quality of communication during a voice call.

In any case, the various media types available in communication system 100 predefined so that processor 210 may adjust the predetermined number in accordance with each media type. During a call setup, an indication of the media type is communicated to processor 210 generally by transmitting a message from an originating WCD indicating the type of communication service desired for a group communication. When processor 210 receives the indication, it adjusts the predetermined number in accordance with the media type identified by the indication. Of course, the predetermined number could also be adjusted in combination with any of the other fixed or variable techniques discussed above.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A wireless communications apparatus for providing frame re-transmission in a broadcast communication system, comprising:

means for receiving a message indicative of a data frame received in error by a wireless communication device, said message including a data frame identification and including identification of said wireless communication device;

means for determining a cumulative number of times that said data frame from a multiple of said wireless communication devices has been received in error; and means for re-transmitting said data frame if said cumulative number of times is greater than a predetermined number, wherein said cumulative number of times is incremented only when said message is received from a wireless communication device that has not previously requested re-transmission of said data frame.

2. The wireless communications apparatus of claim 1, wherein the means for determining a cumulative number of times that said data frame has been received in error comprises:

means for determining whether or not said wireless communication device has previously requested a re-transmission of said data frame; and means for incrementing said cumulative number if said wireless communication device has not previously requested a re-transmission of said data frame.

3. The wireless communications apparatus of claim 2, wherein the means for determining whether or not said wireless communication device has previously requested a re-transmission of said data frame comprises:

means for determining if said wireless communication device identification is stored in an electronic memory;

means for determining if said data frame identification is stored in said electronic memory in association with said wireless communication device identification; and means for determining that said wireless communication device has previously requested a re-transmission of said data frame if said wireless communication device identification is stored in said electronic memory and if said data frame identification is stored in said electronic memory in association with said wireless communication device identification.

4. The wireless communications apparatus of claim 1 wherein said message comprises a negative acknowledgment message (NAK).

5. The wireless communications apparatus of claim 1 further comprising:

means for determining a latency associated with a broadcast transmission; and means for adjusting said predetermined number in accordance with said latency.

6. The wireless communications apparatus of claim 5 wherein the means for determining said latency comprises means for determining a number of data frames waiting to be transmitted in a transmission buffer.

7. The wireless communications apparatus of claim 5 wherein the means for adjusting said predetermined number comprises:

means for decreasing said predetermined number as said latency decreases; and means for increasing said predetermined number as said latency increases.

8. The wireless communications apparatus of claim 1 further comprising:
means for determining a number of wireless communication devices currently receiving a broadcast transmission; and
means for adjusting said predetermined number based on said number of wireless communication devices currently receiving said broadcast transmission.

9. The wireless communications apparatus of claim 8 wherein the means for adjusting said predetermined number comprises:
means for increasing said predetermined number as said number of wireless communication devices currently receiving said broadcast transmission increases; and
means for decreasing said predetermined number as said number of wireless communication devices currently receiving said broadcast transmission decreases.

10. A wireless communications apparatus for providing frame re-transmission in a broadcast communication system, comprising:
means for receiving a message indicative of a frame received in error by a wireless communication device, said message including an identification of said frame and including identification of said wireless communication device;
means for storing, in a memory, a predetermined number for determining when to re-transmit said frame; and
means for determining, in a processor, a cumulative number of times that said frame from a multiple of said wireless communication devices was received in error and for ordering a re-transmission of said frame if said cumulative number of times is greater than said predetermined number, wherein said cumulative number of times is incremented only when said message is received from a wireless communication device that has not previously requested re-transmission of said data frame.

11. The wireless communications apparatus of claim 10 wherein:
means for storing, in a memory, is further for storing said wireless communication device identification; and
means for determining, in a processor, is further for determining a cumulative number of times that said frame was received in error, said cumulative number increased each time that said frame is identified by subsequent messages from other wireless communication devices.

12. The wireless communications apparatus of claim 11 wherein said message comprises a negative acknowledgement message (NAK).

13. An apparatus for providing frame re-transmission in a broadcast communication system, comprising:
a receiver to receive a message indicative of a frame received in error by a wireless communication device, said message including an identification of said frame and including identification of said wireless communication device;
a memory to store a predetermined number to determine when to re-transmit said frame; and
a processor to determine a cumulative number of times that said frame from a multiple of said wireless communication devices was received in error and to order a re-transmission of said frame if said cumulative number of times is greater than said predetermined number, wherein said cumulative number of times is incremented only when said message is received from a wireless communication device that has not previously requested re-transmission of said data frame.

14. The apparatus of claim 13, wherein:
said memory is further configured to store said wireless communication device identification;
said processor is further configured to determine a cumulative number of times that said frame was received in error, said cumulative number increased each time that said frame is identified by subsequent messages from other wireless communication devices.

15. The apparatus of claim 13, wherein said message comprises a negative acknowledgement message (NAK).

16. The apparatus of claim 13, wherein said identification comprises a frame number.

17. A method for providing frame re-transmission in a broadcast communication system, comprising the steps of:
receiving a message indicative of a data frame received in error by a wireless communication device, said message including a data frame identification and including identification of said wireless communication device;
determining a cumulative number of times that said data frame from a multiple of said wireless communication devices has been received in error; and
re-transmitting said data frame if said cumulative number of times is greater than a predetermined number, wherein said cumulative number of times is incremented only when said message is received from a wireless communication device that has not previously requested re-transmission of said data frame.

18. The method of claim 17, wherein the step of determining a cumulative number of times that said data frame has been received in error comprises the steps of:
determining whether or not said wireless communication device has previously requested a re-transmission of said data frame; and
incrementing said cumulative number if said wireless communication device has not previously requested a re-transmission of said data frame.

19. The method of claim 17, wherein said indication comprises a negative acknowledgment message (NAK).

20. The method of claim 17, further comprising the steps of:
determining a latency associated with a broadcast transmission; and
adjusting said predetermined number in accordance with said latency.

21. The method of claim 17, further comprising the steps of:
determining a number of wireless communication devices currently receiving a broadcast transmission;
adjusting said predetermined number based on said number of wireless communication devices currently receiving said broadcast transmission.

* * * * *